(12) United States Patent
Deng et al.

(10) Patent No.: US 11,934,078 B2
(45) Date of Patent: Mar. 19, 2024

(54) DISPLAY PANEL AND DISPLAY DEVICE (71) Applicant: WUHAN CHINA STAR OPTOELECTRONICS TECHNOLOGY CO., LTD., Wuhan (CN)

(72) Inventors: Qian Deng, Wuhan (CN); Rui He, Wuhan (CN); Changchih Huang, Wuhan (CN); Guanghui Liu, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/309,479

(22) PCT Filed: May 12, 2021

(86) PCT No.: PCT/CN2021/093278
§ 371 (c)(1),
(2) Date: Nov. 3, 2022

(87) PCT Pub. No.: WO2022/227120
PCT Pub. Date: Nov. 3, 2022

(65) Prior Publication Data
US 2024/0012304 A1  Jan. 11, 2024

(30) Foreign Application Priority Data
Apr. 27, 2021 (CN) .......................... 202110460337.0

(51) Int. Cl.
*G02F 1/1333* (2006.01)
*G02F 1/1335* (2006.01)
(Continued)

(52) U.S. Cl.
CPC .... *G02F 1/13718* (2013.01); *G02F 1/133365* (2013.01); *G02F 1/133526* (2013.01); *G02F 1/133553* (2013.01); *G02F 1/133769* (2021.01)

(58) Field of Classification Search
CPC .......... G02F 1/13718; G02F 1/133365; G02F 1/133526; G02F 1/133553; G02F 1/133769
See application file for complete search history.

(56) References Cited

FOREIGN PATENT DOCUMENTS

| CN | 102411225 A | 4/2012 |
|---|---|---|
| CN | 102681243 A | 9/2012 |

(Continued)

OTHER PUBLICATIONS

English Machine Translation of Cheng et al.(CN 112596311) (Year: 2023).*

*Primary Examiner* — Donald L Raleigh
(74) *Attorney, Agent, or Firm* — PV IP PC; Wei Te Chung; Zhigang Ma (57) ABSTRACT

A display panel and a display device are disclosed. The display panel includes a photoresist layer, a liquid crystal layer, and a total reflection layer. Liquid crystal molecules included in the liquid crystal cells have a first refractive index and a second refractive index. The first refractive index is greater than the second refractive index, and a refractive index of the total reflection units matches with the first refractive index. The display panel and the display device not only have advantages of low manufacturing cost and eye protection, but can also achieve color and dynamic display.

20 Claims, 4 Drawing Sheets

(51) Int. Cl.
*G02F 1/1337* (2006.01)
*G02F 1/137* (2006.01)

(56) References Cited

FOREIGN PATENT DOCUMENTS

| | | | | |
|---|---|---|---|---|
| CN | 202453607 | U | 9/2012 | |
| CN | 103309073 | A | 9/2013 | |
| CN | 104199225 | A | 12/2014 | |
| CN | 106569365 | A | 4/2017 | |
| CN | 206515585 | U | 9/2017 | |
| CN | 112596311 | A * | 4/2021 | ........... G02F 1/1343 |
| CN | 112596311 | A | 4/2021 | |
| JP | 2000275631 | A | 10/2000 | |
| JP | 2001092367 | A | 4/2001 | |
| WO | 2012146025 | A1 | 11/2012 | |

\* cited by examiner

DISPLAY PANEL AND DISPLAY DEVICE

RELATED APPLICATIONS

This application is a Notional Phase of PCT Patent Application No. PCT/CN2021/093278 having international filing date of May 12, 2021, which claims the benefit of priority of Chinese Patent Application No. 202110460337.0 filed on Apr. 27, 2021. The contents of the above applications are all incorporated by reference as if fully set forth herein in their entirety.

BACKGROUND OF INVENTION

1. Field of Invention

The present application relates to a technical field of displays and particularly to a display panel and a display device.

2. Related Art

Currently, reflective type displays have been widely used in fields of electronic paper, commercial advertising display, and education, wherein electronic paper generally uses electronic ink for display. Electronic ink is usually composed of negatively charged black particles and positively charged white particles. Due to an effect of an electric field, polarity of charges changes so that the particles are arranged in different ways, thereby displaying patterns or text. Advantages of this kind of reflective type electronic paper are power savings and eye protection, but cost is relatively high, and there are still limitations on color and dynamic display.

SUMMARY OF INVENTION

An object of the present application is to provide a display panel and a display device to overcome a problem that there are still limitations on color and dynamic display in current display panels and display devices.

To achieve the above-mentioned object, in a first aspect, the present application provides a display panel, comprising a first substrate and a second substrate opposite to the first substrate, wherein a photoresist layer, a liquid crystal layer, and a total reflection layer are sequentially disposed in a direction from the first substrate to the second substrate, the photoresist layer comprises a plurality of photoresists, the liquid crystal layer comprises a plurality of liquid crystal cells disposed in a one-to-one correspondence with the photoresists, and the total reflection layer comprises a plurality of total reflection units disposed in a one-to-one correspondence with the liquid crystal cells; wherein liquid crystal molecules included in the liquid crystal cells have a first refractive index and a second refractive index, the first refractive index is a refractive index for light perpendicular to a major axis of each of the liquid crystal molecules, the second refractive index is a refractive index for light parallel to the major axis of each of the liquid crystal molecules, the first refractive index is greater than the second refractive index, and the total reflection units have a refractive index matching with the first refractive index.

In some embodiments, the photoresists comprise polymerizable cholesteric liquid crystals, and different parts of the polymerizable cholesteric liquid crystals of the photoresists for reflecting lights of different colors have different pitches.

In some embodiments, the polymerizable cholesteric liquid crystals of the photoresists for reflecting red light have a pitch greater than a pitch of the polymerizable cholesteric liquid crystals of the photoresists for reflecting green light, and the polymerizable cholesteric liquid crystals of the photoresists for reflecting the green light have a pitch greater than a pitch of the polymerizable cholesteric liquid crystals of the photoresists for reflecting blue light.

In some embodiments, a first electrode and a first alignment layer are sequentially disposed in a direction from the photoresist layer to the liquid crystal layer, and a second electrode layer and a second alignment layer are sequentially disposed in a direction from the second substrate to the liquid crystal layer.

In some embodiments, the first electrode layer comprises a plurality of first electrodes disposed in a one-to-one correspondence with the liquid crystal cells, and the second electrode layer comprises a plurality of second electrodes disposed in a one-to-one correspondence with the liquid crystal cells.

In some embodiments, polarity of the liquid crystal molecules of the liquid crystal cells is positive, and the first alignment layer and the second alignment layer are arranged in an anti-parallel alignment or in a parallel alignment; wherein based on no voltage applied to the first electrodes and the second electrodes corresponding to the liquid crystal cells, the major axes of the liquid crystal molecules of the liquid crystal cells are arranged in a horizontal direction; and wherein based on a voltage applied to the first electrodes and the second electrodes corresponding to the liquid crystal cells, the major axes of the liquid crystal molecules of the liquid crystal cells are arranged in a vertical direction.

In some embodiments, polarity of the liquid crystal molecules of the liquid crystal cells is negative, and the first alignment layer and the second alignment layer are arranged in a vertical alignment; wherein based on a voltage applied to the first electrodes and the second electrodes corresponding to the liquid crystal cells, the major axes of the liquid crystal molecules of the liquid crystal cells are arranged in a horizontal direction; and wherein based on no voltage applied to the first electrodes and the second electrodes corresponding to the liquid crystal cells, the major axes of the liquid crystal molecules of the liquid crystal cells are arranged in a vertical direction.

In some embodiments, each of the total reflection units is a prism and is semicircular or right angular in shape.

In some embodiments, a light absorption layer is disposed between the first substrate and the photoresist layer.

In some embodiments, a microlens layer is disposed between the total reflection layer and the second substrate or on a side of the second substrate away from the total reflection layer and comprises a plurality of microlens units.

In a second aspect, the present application provides a display device, comprising a display panel, and the display panel comprising a first substrate and a second substrate opposite to the first substrate, wherein a photoresist layer, a liquid crystal layer, and a total reflection layer are sequentially disposed in a direction from the first substrate to the second substrate, the photoresist layer comprises a plurality of photoresists, the liquid crystal layer comprises a plurality of liquid crystal cells disposed in a one-to-one correspondence with the photoresists, and the total reflection layer comprises a plurality of total reflection units disposed in a one-to-one correspondence with the liquid crystal cells; wherein liquid crystal molecules included in the liquid crystal cells have a first refractive index and a second refractive index, the first refractive index is a refractive index for light perpendicular to a major axis of each of the liquid crystal molecules, the second refractive index is a refractive index for light parallel to the major axis of each of the liquid crystal molecules, the first refractive index is greater than the second refractive index, and the total reflection units have a refractive index matching with the first refractive index.

In some embodiments, the photoresists comprise polymerizable cholesteric liquid crystals, and different parts of the polymerizable cholesteric liquid crystals of the photoresists for reflecting lights of different colors have different pitches.

In some embodiments, the polymerizable cholesteric liquid crystals of the photoresists for reflecting red light have a pitch greater than a pitch of the polymerizable cholesteric liquid crystals of the photoresists for reflecting green light, and the polymerizable cholesteric liquid crystals of the photoresists for reflecting the green light have a pitch greater than a pitch of the polymerizable cholesteric liquid crystals of the photoresists for reflecting blue light.

In some embodiments, a first electrode and a first alignment layer are sequentially disposed in a direction from the photoresist layer to the liquid crystal layer, and a second electrode layer and a second alignment layer are sequentially disposed in a direction from the second substrate to the liquid crystal layer.

In some embodiments, the first electrode layer comprises a plurality of first electrodes disposed in a one-to-one correspondence with the liquid crystal cells, and the second electrode layer comprises a plurality of second electrodes disposed in a one-to-one correspondence with the liquid crystal cells.

In some embodiments, polarity of the liquid crystal molecules of the liquid crystal cells is positive, and the first alignment layer and the second alignment layer are arranged in an anti-parallel alignment or in a parallel alignment; wherein based on no voltage applied to the first electrodes and the second electrodes corresponding to the liquid crystal cells, the major axes of the liquid crystal molecules of the liquid crystal cells are arranged in a horizontal direction; and wherein based on a voltage applied to the first electrodes and the second electrodes corresponding to the liquid crystal cells, the major axes of the liquid crystal molecules of the liquid crystal cells are arranged in a vertical direction.

In some embodiments, polarity of the liquid crystal molecules of the liquid crystal cells is negative, and the first alignment layer and the second alignment layer are arranged in a vertical alignment; wherein based on a voltage applied to the first electrodes and the second electrodes corresponding to the liquid crystal cells, the major axes of the liquid crystal molecules of the liquid crystal cells are arranged in a horizontal direction; and wherein based on no voltage applied to the first electrodes and the second electrodes corresponding to the liquid crystal cells, the major axes of the liquid crystal molecules of the liquid crystal cells are arranged in a vertical direction.

In some embodiments, each of the total reflection units is a prism and is semicircular or right angular in shape.

In some embodiments, a light absorption layer is disposed between the first substrate and the photoresist layer.

In some embodiments, a microlens layer is disposed between the total reflection layer and the second substrate or on a side of the second substrate away from the total reflection layer and comprises a plurality of microlens units.

The display panel and the display device provided by the embodiments of the present application have advantageous effects as follows: the photoresists include the polymerizable cholesteric liquid crystals. Applying the polymerizable cholesteric liquid crystals to a field of reflective displays and using the ambient light to facilitate displaying of the display panel can make the display panel display colorful patterns or text, and greatly reduce manufacturing cost of the display panel. Since each of the photoresists can be individually controlled to emit lights of specific colors according to whether or not the photoresists are irradiated by the ambient light, the display panel can achieve high-precision dynamic display. Because the light that enters human eyes from the display panel is the light reflected by the photoresists, and the light being reflected filters out a large amount of high-energy and high-transmittance light, so that the light emitted from the display panel is harmless to the human eyes, that is, the display panel has an eye protection function.

DESCRIPTION OF EMBODIMENTS

In order to make the purpose, technical solutions, and effects of this application clearer, the following further describes this application in detail with reference to the accompanying drawings and examples. It should be understood that the specific embodiments described here are only used to explain the present application, and are not used to limit the present application.

Figure 1:
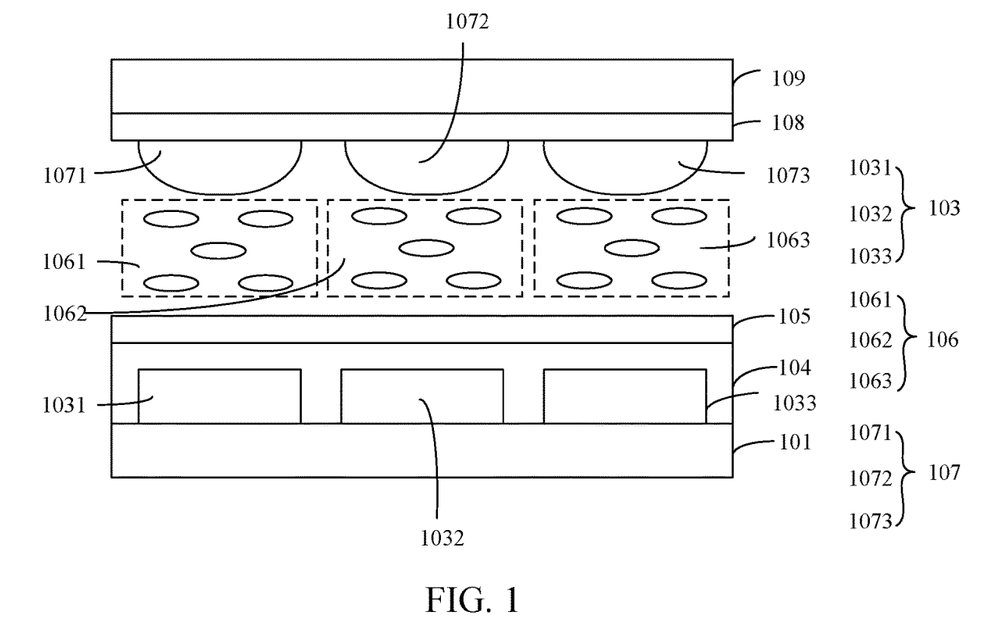
FIG. 1 is a schematic structural view of a display panel provided by an embodiment of the present application.

Please refer to FIG. 1, which is a schematic structural view of a display panel provided by an embodiment of the present application. The display panel shown in FIG. 1 includes a first substrate 101 and a second substrate 102 disposed opposite to the first substrate 101. The first substrate 101 can be a rigid substrate or a flexible substrate. The first substrate 101 may be made of a material selected from the group consisting of glass, silicon dioxide, polyethylene, polypropylene, polystyrene, polylactic acid, polyethylene terephthalate, polyimide, and polyurethane. The second substrate 109 and the first substrate 101 may be made of same or different materials, which are not specifically limited by the embodiment of the present application.

The display panel shown in FIG. 1 is provided with a photoresist layer 103, a liquid crystal layer 106, and a total reflection layer 107 sequentially disposed in a direction from the first substrate 101 to the second substrate 109.

The photoresist layer 103 includes a plurality of photoresists, and the photoresists include polymerizable cholesteric liquid crystals. It should be noted that the polymerizable cholesteric liquid crystals have selective reflective properties. When the polymerizable cholesteric liquid crystals are irradiated by ambient light, only light whose wavelength corresponds to a pitch of the polymerizable cholesteric liquid crystals is reflected. Specifically, please refer to FIG. 2, which is a schematic view of a color development principle of the polymerizable cholesteric liquid crystals provided by the embodiment of the application. A calculation formula for calculating a wavelength λ of light reflected by the polymerizable cholesteric liquid crystals is: λ=2nP sin φ, wherein n is an average refractive index of the polymerizable cholesteric liquid crystals, and an adjustable range of the average refractive index is not broad, which cannot cover a visible light band. P is a pitch period of each of the polymerizable cholesteric liquid crystals, 2P is a pitch of the polymerizable cholesteric liquid crystals, and φ is an angle between the ambient light incident on each of the polymerizable cholesteric liquid crystals and a surface of each of the polymerizable cholesteric liquid crystals and is generally for use in specific scenarios, which is non-adjustable.

Figure 2:
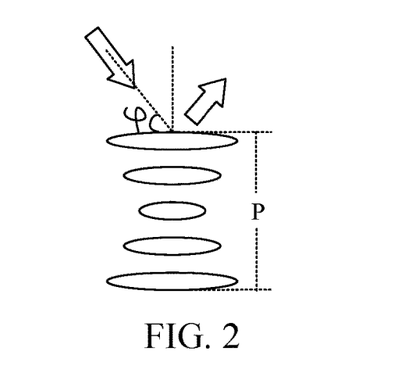
FIG. 2 is a schematic view of a color development principle of polymerizable cholesteric liquid crystals provided by an embodiment of the present application.

In summary, adjusting only the pitch of the polymerizable cholesteric liquid crystals can make the polymerizable cholesteric liquid crystals reflect lights of different wavelengths. Since colors of lights are related to wavelengths, the polymerizable cholesteric liquid crystals can reflect lights having different colors. Generally, the greater the pitch of the polymerizable cholesteric liquid crystals is, the longer the wavelength of the light reflected by the polymerizable cholesteric liquids crystal is. That is, a pitch of the polymerizable cholesteric liquid crystals that reflects red light>a pitch of the polymerizable cholesteric liquid crystals that reflects green light>a pitch of the polymerizable cholesteric liquid crystals that reflects blue light.

It should be noted that the pitch of the polymerizable cholesteric liquid crystal is affected by various factors, such as temperatures, magnetic fields, and cell thicknesses. Generally, chiral molecules are used to be added to the polymerizable cholesteric liquid crystal to control the pitch of the polymerizable cholesteric liquid crystal without changing external environment.

Figure 3:
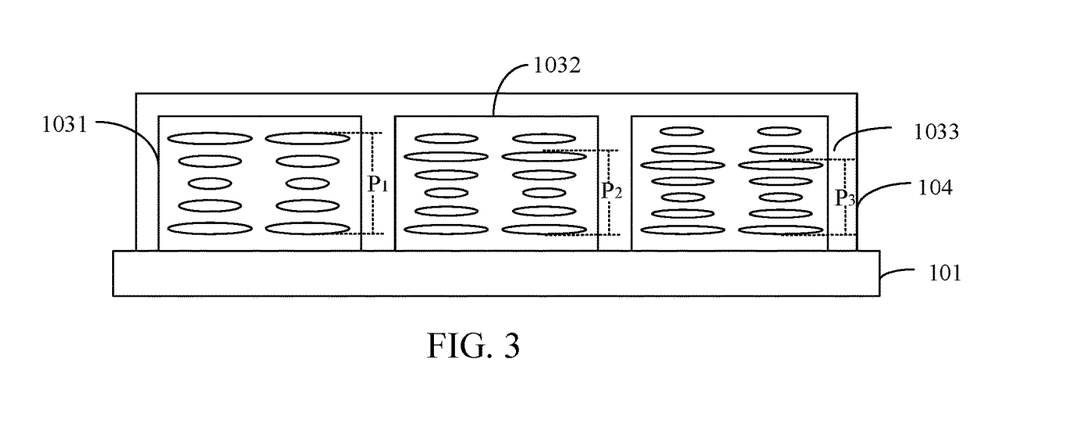
FIG. 3 is a schematic enlarged view of a photoresist layer shown in FIG. 1.

Since the photoresists in the embodiment of the present application include the polymerizable cholesteric liquid crystals, the photoresists can reflect lights of specific colors after being struck by the ambient light. The photoresist layer 103 shown in FIG. 1 includes a first photoresist 1031, a second photoresist 1032, and a third photoresist 1033. Please refer to FIG. 3, which is a schematic enlarged view of the photoresist layer shown in FIG. 1, wherein a pitch $2P_1$ of the polymerizable cholesteric liquid crystals of the first photoresist 1031>a pitch $2P_2$ of the polymerizable cholesteric liquid crystals of the second photoresist 1032>a pitch $2P_3$ of the polymerizable cholesteric liquid crystals of the third photoresist 1033, so that the first photoresist 1031, the second photoresist 1032, and the third photoresist 1033 reflect red light, green light, and blue light, respectively.

The liquid crystal layer 106 includes a plurality of liquid crystal cells disposed in a one-to-one correspondence with the photoresists. The total reflection layer 107 includes a plurality of total reflection units disposed in a one-to-one correspondence with the liquid crystal cells. Specifically, each of the total reflection units may be a liquid crystal lens or made of a transparent resin material.

Specifically, liquid crystal molecules included in the liquid crystal cells have a first refractive index ne and a second refractive index no. The first refractive index ne is a refractive index for lights perpendicular to a major axis of each of the liquid crystal molecules, and the second refractive index no is a refractive index for lights parallel to the major axis of each of the liquid crystal molecules, wherein the first refractive index>the second refractive index, and the total reflection units have a refractive index matching with the first refractive index ne.

When the major axes of the liquid crystal molecules of the liquid crystal cells are arranged in a parallel direction, the refractive index of the total reflection units is equal to the first refractive index ne of the liquid crystal molecules, and the ambient light incident from the second substrate 109 sequentially passes through the total reflection units and the liquid crystal cells to the photoresists, so that the photoresists reflect lights of specific colors.

When the major axes of the liquid crystal molecules of the liquid crystal cells are arranged in a vertical direction, the refractive index of the total reflection units is greater than the second refractive index no of the liquid crystal molecules, so that the ambient light incident from the second substrate 109 is totally reflected at an interface between the total reflection units and the liquid crystal cells and then is emitted outward from the second substrate 109, and thus the photoresists cannot reflect lights of specific colors.

It can be understood that the photoresists in the embodiment of the present application include the polymerizable cholesteric liquid crystals. Applying the polymerizable cholesteric liquid crystals to a field of reflective displays and using the ambient light to facilitate displaying of the display panel can make the display panel display colorful patterns or text, and greatly reduce manufacturing cost of the display panel. Since each of the photoresists can be individually controlled to emit lights of specific colors according to whether or not the photoresists are irradiated by the ambient light, the display panel can achieve high-precision dynamic display. Because the lights that enter people's eyes from the display panel are the lights reflected by the photoresists, and the lights being reflected filter out a large amount of high-energy and high-transmittance lights, so that the lights emitted from the display panel are harmless to people's eyes, i.e., the display panel has an eye protection function.

In some embodiments, the photoresists can be prepared by using the polymerizable cholesteric liquid crystals, wherein different parts of the polymerizable cholesteric liquid crystals of the photoresists for reflecting lights of different colors have different pitches.

Specifically, a process of preparing the photoresists using the polymerizable cholesteric liquid crystals is as follows:

First, provide the first substrate 101. The polymerizable cholesteric liquid crystals are coated on the first substrate 101, and the polymerizable cholesteric liquid crystals are polymerized by light curing or thermal curing to obtain an all-solid cholesteric liquid crystal film, i.e., the photoresists. In order to obtain the photoresists for reflecting red, green, and blue lights to enable the display panel to realize normal display of the three primary colors, the polymerizable cholesteric liquid crystals having three different pitches can be used to prepare the photoresists that reflect red light, green light, and blue light, respectively.

For example, polymerizable cholesteric liquid crystals with a first pitch (reflecting red light) are first coated on the first substrate 101, partial ultraviolet curing is used to polymerize the polymerizable cholesteric liquid crystals in a partial area of the first substrate 101, and then uncured polymerizable cholesteric liquid crystals are washed away, leaving only a patterned all-solid cholesteric liquid crystal film that reflects red light on the first substrate 101, i.e., the photoresist reflecting red light. Then, repeat the above steps on polymerizable cholesteric liquid crystals with a second pitch (reflecting green light) and a third pitch (reflecting blue light) in turn to obtain a photoresist reflecting green light and a photoresist reflecting blue light, wherein the first pitch>the second pitch>the third pitch.

In some embodiments, please refer to FIG. 1. The display panel shown in FIG. 1 includes the first substrate 101, the photoresist layer 103 disposed on the first substrate 101, a planarization layer 104 disposed on and covering the first substrate 101, a first electrode layer 105 disposed on the planarization layer 104, a first alignment layer (not shown in FIG. 1) disposed on the first electrode layer 105, the liquid crystal layer 106 disposed on the first electrode layer 105, the total reflection layer 107 disposed on the liquid crystal layer 106, a second alignment layer (not shown in FIG. 1) disposed on the total reflection layer 107, a second electrode layer 108 disposed on the second alignment layer, and the second substrate 109 disposed on the second electrode layer 108.

The photoresist layer 103 of the display panel shown in FIG. 1 includes the first photoresist 1031, the second photoresist 1032, and the third photoresist 1033 that reflect red light, green light, and blue light, respectively.

The liquid crystal layer 106 of the display panel shown in FIG. 1 includes a first liquid crystal cell 1061, a second liquid crystal cell 1062, and a third liquid crystal cell 1063. The first liquid crystal cell 1061 and the first photoresist 1031 are correspondingly disposed, the second liquid crystal cell 1062 and the second photoresist 1032 are correspondingly disposed, and the third liquid crystal cell 1063 and the third photoresist 1033 are correspondingly disposed.

The total reflection layer 107 of the display panel shown in FIG. 1 includes a first total reflection unit 1071, a second total reflection unit 1072, and a third total reflection unit 1073. The first total reflection unit 1071 and the first liquid crystal cell 1061 are correspondingly disposed, the second total reflection unit 1072 and the second liquid crystal cell 1062 are correspondingly disposed, and the third total reflection unit 1073 and the third liquid crystal cell 1063 are correspondingly disposed.

The first electrode layer 105 includes a plurality of first electrodes spaced apart from each other and disposed in a one-to-one correspondence with the liquid crystal cells in the liquid crystal layer 106. The first electrode layer 105 of the display panel shown in FIG. 1 includes three first electrodes (not shown in FIG. 1). The three first electrodes are disposed in a one-to-one correspondence with three of the liquid crystal cells (the first liquid crystal cell 1061, the second liquid crystal cell 1062, and the third liquid crystal cell 1063).

The second electrode layer 108 includes a plurality of second electrodes spaced apart from each other and disposed in a one-to-one correspondence with the liquid crystal cells in the liquid crystal layer 106. The second electrode layer 108 of the display panel shown in FIG. 1 includes three second electrodes (not shown in FIG. 1). The three second electrodes are disposed in a one-to-one correspondence with the three liquid crystal cells (the first liquid crystal cell 1061, the second liquid crystal cell 1062, and the third liquid crystal cell 1063).

In some embodiments, polarity of the liquid crystal molecules of the liquid crystal cells is positive, and the first alignment layer and the second alignment layer are in an anti-parallel alignment or in a parallel alignment. Please refer to FIG. 4, which is a schematic view of a working principle of the display panel in the anti-parallel alignment provided by the embodiment of the application. A structure of the display panel shown in FIG. 4 is same as a structure of the display panel shown in FIG. 1, and will not be repeated here.

Figure 4:
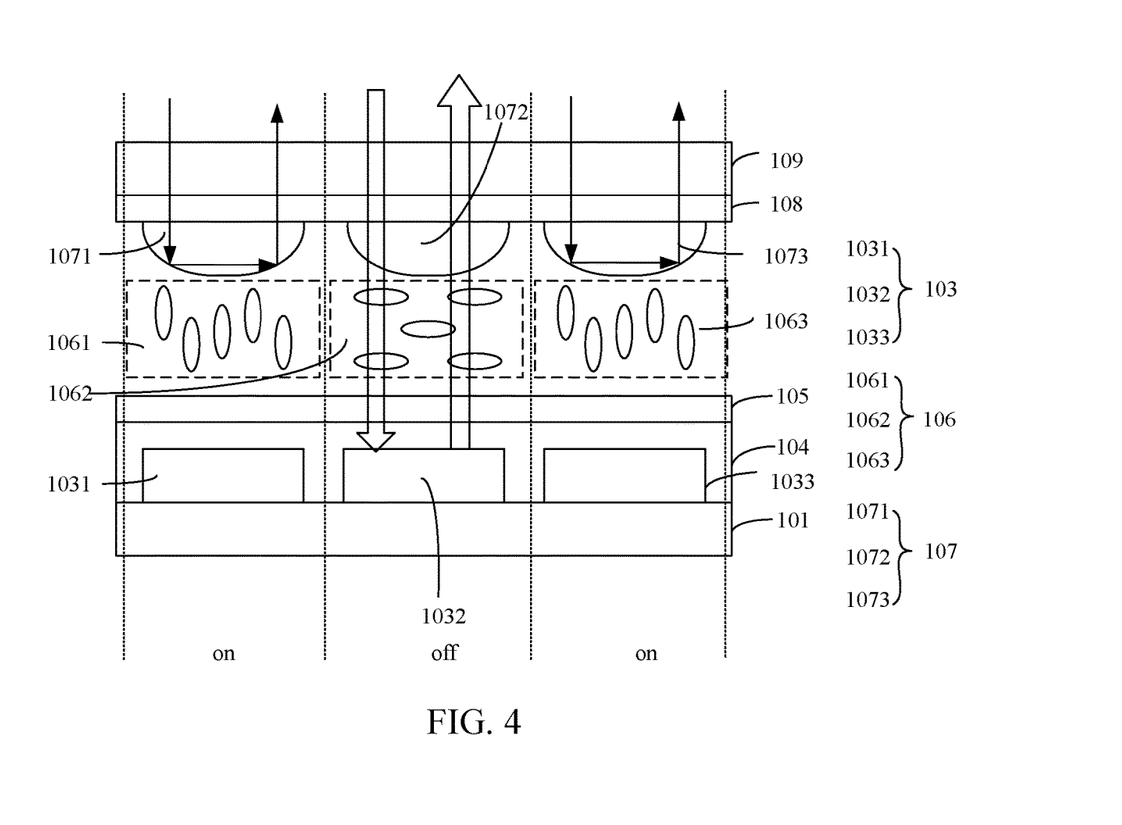
FIG. 4 is a schematic view of a working principle of the display panel in an anti-parallel alignment provided by an embodiment of the present application.

The second liquid crystal cell 1062 in the liquid crystal layer 106 of the display panel shown in FIG. 4 is in a power-off state, wherein the second liquid crystal cell 1062 in the power-off state refers to a state in which no voltage is applied to the first electrode and the second electrode corresponding to the second liquid crystal cell 1062. In this manner, the major axes of the liquid crystal molecules of the liquid crystal cell 1062 are arranged in a horizontal direction, the refractive index of the total reflection units is equal to the first refractive index ne of the liquid crystal molecules. Therefore, according to the principle of light propagation in media with different refractive indexes, the ambient light incident from the second substrate 109 will sequentially pass through the second total reflection unit 1072 and the second liquid crystal cell 1062 to the second photoresist 1032, so that the second photoresist 1032 reflects green light. It should be noted that the ambient light reaching the second photoresist 1032 is linearly polarized light, and a polarization direction is horizontal.

The first liquid crystal cell 1061 and the third liquid crystal cell 1063 in the liquid crystal layer 106 of the display panel shown in FIG. 4 are in a power-on state, wherein the first liquid crystal cell 1061 in the power-on state refers to a state in which a voltage is applied to the first electrode and the second electrode corresponding to the first liquid crystal cell 1061. The third liquid crystal cell 1063 in the power-on state refers to a state in which a voltage is applied to the first electrode and the second electrode corresponding to the third liquid crystal cell 1063. At this time, the major axes of the liquid crystal molecules of the first liquid crystal cell 1061 and the third liquid crystal cell 1063 are arranged in the vertical direction. Taking the first liquid crystal cell 1061 as an example, since the refractive index of the first total reflection cell 1071 is greater than the second refractive index no of the liquid crystal molecules, according to the principle of light propagation in media with different refractive indexes, the ambient light incident from the second substrate 109 will be emitted outward from the second substrate 109 after being totally reflected at an interface between the first total reflection unit 1071 and the first liquid crystal cell 1061, and thus the first photoresist 1031 does not reflect light. Likewise, the third photoresist 1033 does not reflect light as well.

It should be noted that for a display panel configured in the parallel alignment (i.e., the first alignment layer and the second alignment layer are arranged orthogonally in alignment directions; for example, an alignment direction of the second alignment layer is a direction parallel to a paper surface, and an alignment direction of the first alignment layer is a direction perpendicular to the paper surface), when a liquid crystal cell is in the power-off state, the liquid crystal molecules in the liquid crystal cells are arranged spirally. Specifically, the alignment direction of the second alignment layer adjacent to the total reflection unit is the direction parallel to the paper surface, and the axes of the liquid crystal molecules in the liquid crystal cells adjacent to the total reflection units are arranged in the direction parallel to the paper surface, which is also a kind of arrangement in the horizontal direction. Therefore, the ambient light incident from the second substrate 109 can pass through the total reflection unit to enter the liquid crystal cell. The alignment direction of the first alignment layer away from the total reflection unit is the direction perpendicular to the paper surface, and the axes of the liquid crystal molecules in the liquid crystal cells away from the total reflection units are arranged in the direction perpendicular to the paper surface. In this manner, after the ambient light incident from the second substrate 109 passes through the total reflection units and the liquid crystal cells, the ambient light becomes elliptically polarized light. When a rotation direction of the elliptically polarized light is consistent with a rotation direction of a spiral structure of the liquid crystal molecules located at a lower part of the liquid crystal cells, the elliptically polarized light can irradiate the photoresist, so that the photoresist can reflect light having a specific color.

When the liquid crystal cell is in the power-on state, the major axes of the liquid crystal molecules of the liquid crystal cell are arranged in a vertical direction. Since the refractive index of the total reflection unit is greater than the second refractive index of the liquid crystal molecules, according to the principle of light propagation in media with different refractive indexes, the ambient light incident from the second substrate 109 will be emitted outward from the second substrate 109 after being totally reflected at the interface between the first total reflection unit and the liquid crystal cell, and thus the photoresist does not reflect light.

In some embodiments, polarity of the liquid crystal molecules of the liquid crystal cells is negative, and the first alignment layer and the second alignment layer are arranged in a vertical alignment. Please refer to FIG. 5, which is a schematic view of a working principle of the display panel in a vertical alignment provided by the embodiment of the application. A structure of the display panel shown in FIG. 5 is same as the structure of the display panel shown in FIG. 1, and will not be repeated here.

Figure 5:
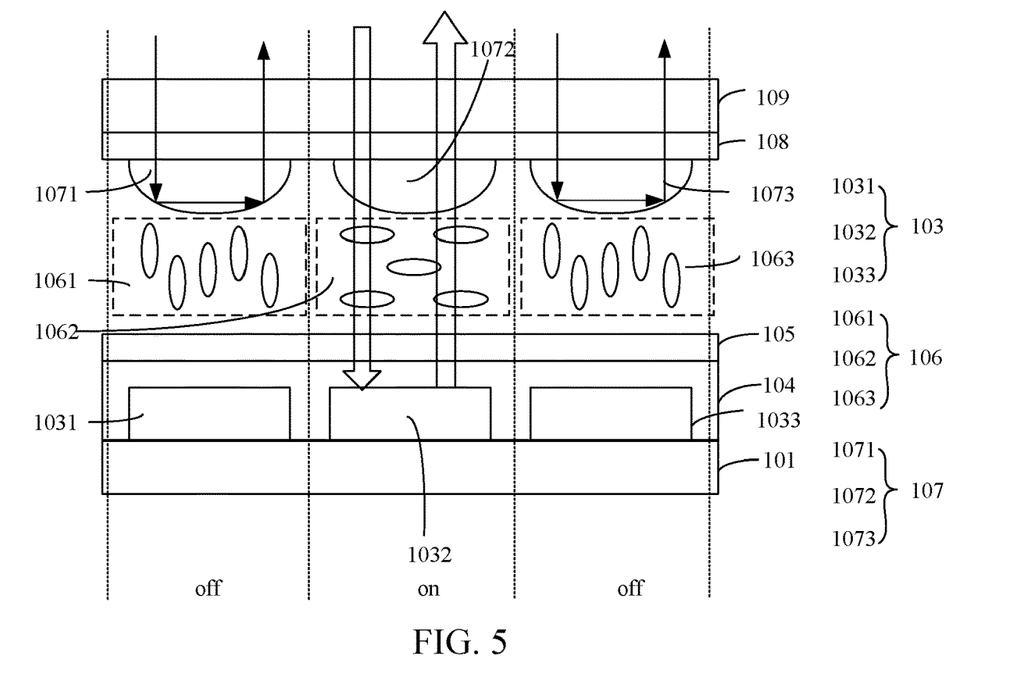
FIG. 5 is a schematic view of a working principle of the display panel in a vertical alignment provided by an embodiment of the present application.

The second liquid crystal cell 1062 of the liquid crystal layer 106 of the display panel shown in FIG. 5 is in a power-on state, wherein the second liquid crystal cell 1062 in the power-on state refers to a state in which a voltage is applied to the first electrode and the second electrode corresponding to the second liquid crystal cell 1062. In this manner, the major axes of the liquid crystal molecules of the liquid crystal cell 1062 are arranged in a horizontal direction, the refractive index of the total reflection units is equal to the first refractive index ne of the liquid crystal molecules. Therefore, according to the principle of light propagation in media with different refractive indexes, the ambient light incident from the second substrate 109 will sequentially pass through the second total reflection unit 1072 and the second liquid crystal cell 1062 to the second photoresist 1032, so that the second photoresist 1032 reflects green light.

The first liquid crystal cell 1061 and the third liquid crystal cell 1063 in the liquid crystal layer 106 of the display panel shown in FIG. 5 are in a power-off state, wherein the first liquid crystal cell 1061 in the power-off state refers to a state in which no voltage is applied to the first electrode and the second electrode corresponding to the first liquid crystal cell 1061. The third liquid crystal cell 1063 in the power-off state refers to a state in which no voltage is applied to the first electrode and the second electrode corresponding to the third liquid crystal cell 1063. In this manner, the major axes of the liquid crystal molecules of the first liquid crystal cell 1061 and the third liquid crystal cell 1063 are arranged in a vertical direction. Taking the first liquid crystal cell 1061 as an example, since the refractive index of the first total reflection cell 1071 is greater than the second refractive index no of the liquid crystal molecules, according to the principle of light propagation in media with different refractive indexes, the ambient light incident from the second substrate 109 will be emitted outward from the second substrate 109 after being totally reflected at an interface between the first total reflection unit 1071 and the first liquid crystal cell 1061, and thus the first photoresist 1031 does not reflect light. Likewise, the third photoresist 1033 does not reflect light, either.

Figure 6:
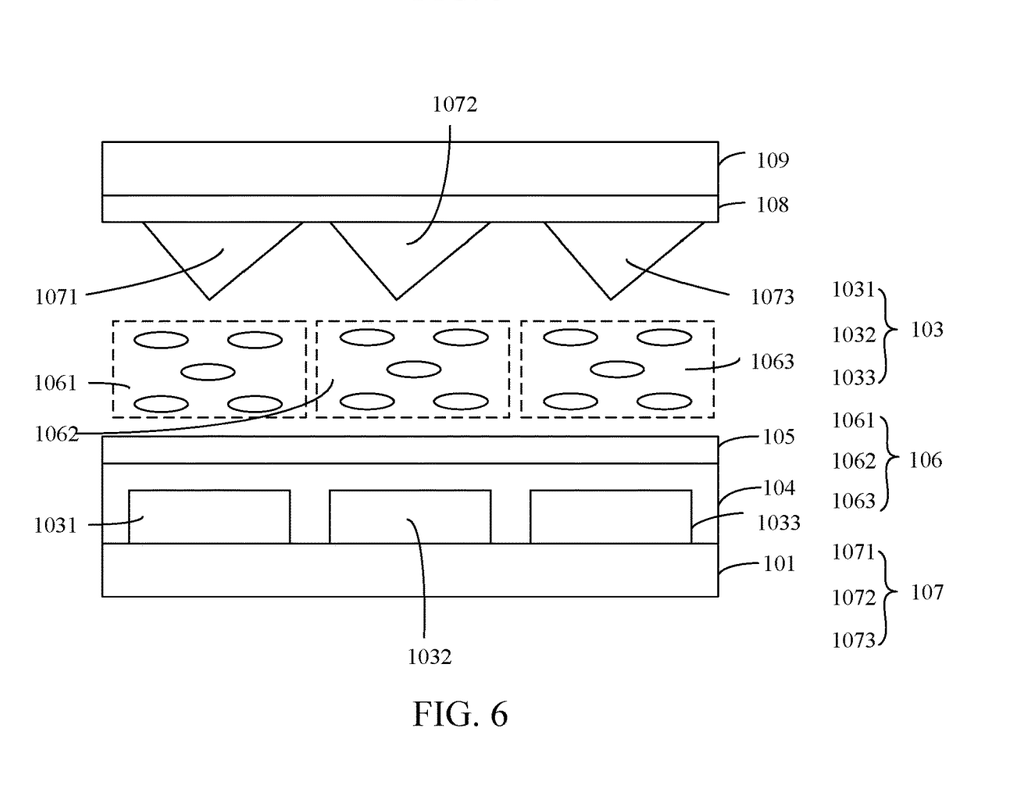
FIG. 6 is a schematic structural view of a display panel provided by another embodiment of the present application.

In some embodiments, each of the total reflection units is a prism and is semicircular or right angular in shape. The total reflection units shown in FIG. 1 are semicircular in shape, wherein each of the semicircular total reflection units has a curved shape adjacent to the liquid crystal layer 106. FIG. 6 is a schematic structural view of a display panel provided by another embodiment of the present application. A structure of the display panel shown in FIG. 6 is similar to the structure of the display panel shown in FIG. 5 and is different in that the total reflection units shown in FIG. 6 are right angular in shape, wherein each of the right angular total reflection units has a right-angle shape formed by two sides perpendicular to each other and close to the liquid crystal layer 106.

Figure 7:
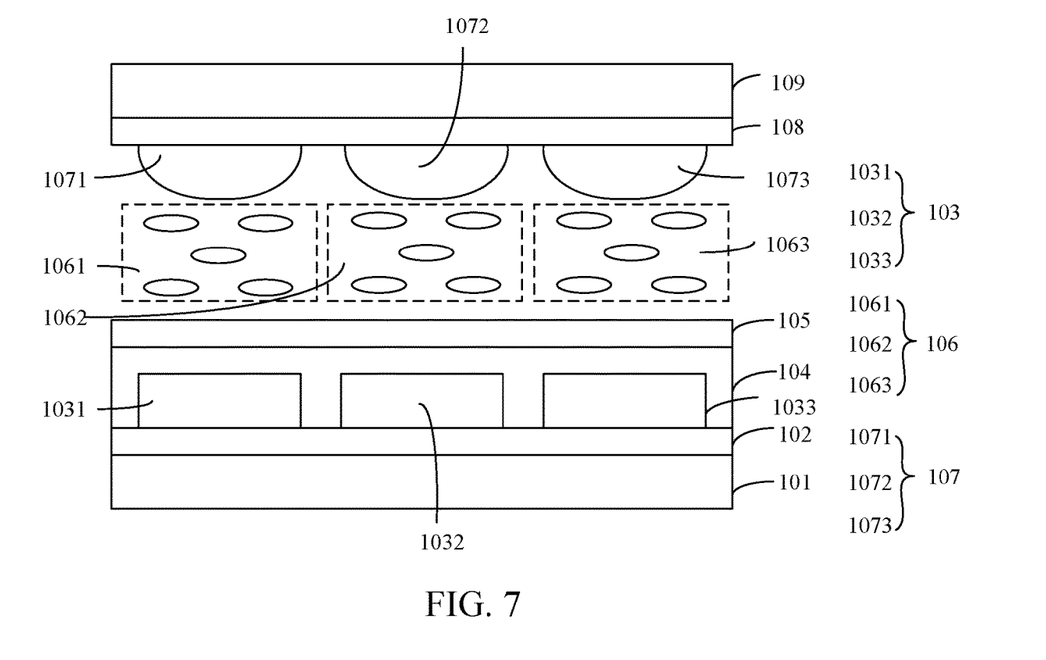
FIG. 7 is a schematic structural view of a display panel provided by yet another embodiment of the present application.

In some embodiments, please refer to FIG. 7, which is a schematic structural view of a display panel provided by another embodiment of the present application, wherein a light absorption layer 102 is disposed between the first substrate 101 and the photoresist layer 103 to absorb transmitted light, so that light entering people's eyes is light only reflected by the photoresist layer 103, thereby not only increasing display contrast, but improving eye protection performance of the display panel.

Figure 8:
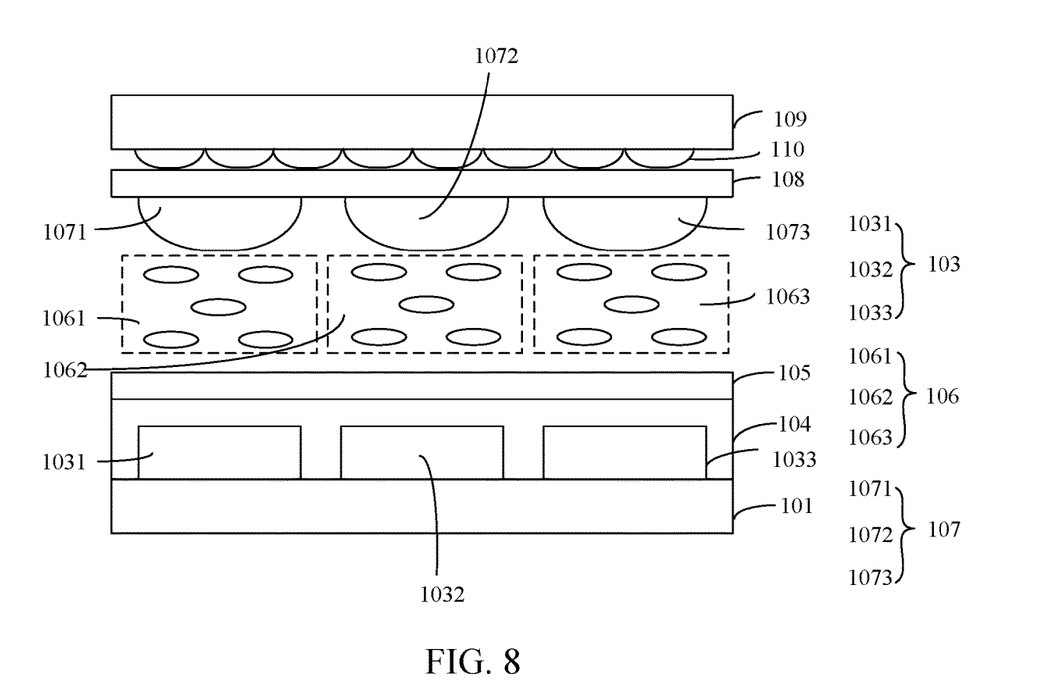
FIG. 8 is a schematic structural view of a display panel provided by still another embodiment of the present application.

In some embodiments, please refer to FIG. 8, which is a schematic structural view of a display panel provided by another embodiment of the present application. A microlens layer 110 is disposed between the total reflection layer 107 and the second substrate 109 or on a side of the second substrate 109 away from the total reflection layer 107. It should be noted the microlens layer 110 shown in FIG. 8 is disposed between the total reflection layer 107 and the second substrate 109 and includes a plurality of microlens units. A physical size of each of the microlens units does not need to be consistent with a size of the total reflection unit, nor does the microlens units need to be disposed in a one-to-one correspondence with the total reflection units, which can be set according to actual needs. Generally, the greater a number of microlens units corresponding to a single total reflection unit is, the better. A refractive index of the microlens units is related to thickness of the second substrate 109 and design of an optical path. A most suitable refractive index of the microlens units can generally be obtained through optical path simulation and actual measurement. It can be understood that because the ambient light incident on the display panel at large angles cannot be totally reflected by the total reflection units, in order to improve utilization of the ambient light, the microlens layer 110 can be provided between the total reflection layer 107 and the second substrate 109 or on the side of the second substrate 109 away from the total reflection layer 107, so that the ambient light incident on the display panel at the large angles passes through the microlens layer 110 and then enters the total reflection layer 107 at a relatively collimated angle, thereby increasing display contrast.

An embodiment of the present application further provides a display device including the display panel of any one of the above-mentioned embodiments. The display panel shown in FIG. 1 includes the first substrate 101 and the second substrate 102 disposed opposite to each other. The photoresist layer 103, the liquid crystal layer 106, and the total reflection layer 107 are sequentially disposed in the direction from the first substrate 101 to the second substrate 109.

The photoresist layer 103 includes the photoresists, and the photoresists include the polymerizable cholesteric liquid crystals. It should be noted that the polymerizable cholesteric liquid crystals have selective reflective properties. When the polymerizable cholesteric liquid crystals are irradiated by the ambient light, only light whose wavelength corresponds to a pitch of the polymerizable cholesteric liquid crystals is reflected. Specifically, please refer to FIG. 2, which is the schematic view of the color development principle of the polymerizable cholesteric liquid crystals provided by the embodiment of the application. A calculation formula for calculating a wavelength λ of light reflected by the polymerizable cholesteric liquid crystals is as follows: $\lambda = 2nP \sin \varphi$, wherein n is an average refractive index of the polymerizable cholesteric liquid crystals, and an adjustable range of the average refractive index is not broad, which cannot cover a visible light band. P is a pitch period of each of the polymerizable cholesteric liquid crystals, 2P is a pitch of the polymerizable cholesteric liquid crystal, and φ is an angle between the ambient light incident on each of the polymerizable cholesteric liquid crystals and a surface of each of the polymerizable cholesteric liquid crystals and is generally for use in specific scenarios, which is non-adjustable.

In summary, adjusting only the pitch of the polymerizable cholesteric liquid crystals can make the polymerizable cholesteric liquid crystal reflect light of different wavelengths. Since colors of lights are related to wavelengths, the polymerizable cholesteric liquid crystals can reflect lights having different colors. Generally, the greater the pitch of the polymerizable cholesteric liquid crystals is, the longer the wavelength of the light reflected by the polymerizable cholesteric liquid crystals is. That is, a pitch of the polymerizable cholesteric liquid crystals that reflects red light>a pitch of the polymerizable cholesteric liquid crystals that reflects green light>a pitch of the polymerizable cholesteric liquid crystals that reflects blue light.

It should be noted that the pitch of the polymerizable cholesteric liquid crystal is affected by various factors, such as temperatures, magnetic fields, and cell thicknesses. Generally, chiral molecules are used to be added to the polymerizable cholesteric liquid crystal to control the pitch of the polymerizable cholesteric liquid crystal without changing external environment.

Since the photoresists in the embodiment of the present application include the polymerizable cholesteric liquid crystals, the photoresists can reflect lights of specific colors after being struck by the ambient light. The photoresist layer 103 shown in FIG. 1 includes the first photoresist 1031, the second photoresist 1032, and the third photoresist 1033. Please refer to FIG. 3, which is a schematic enlarged view of the photoresist layer shown in FIG. 1, wherein a pitch $2P_1$ of the polymerizable cholesteric liquid crystals of the first photoresist 1031>a pitch $2P_2$ of the polymerizable cholesteric liquid crystals of the second photoresist 1032>a pitch $2P_3$ of the polymerizable cholesteric liquid crystals of the third photoresist 1033, so that the first photoresist 1031, the second photoresist 1032, and the third photoresist 1033 reflect red light, green light, and blue light, respectively.

The liquid crystal layer 106 includes the liquid crystal cells disposed in a one-to-one correspondence with the photoresists. The total reflection layer 107 includes the total reflection units disposed in a one-to-one correspondence with the liquid crystal cells.

Specifically, the liquid crystal molecules of the liquid crystal cells have the first refractive index ne and the second refractive index no. The first refractive index ne is a refractive index for light perpendicular to a major axis of each of the liquid crystal molecules, and the second refractive index no is a refractive index for light parallel to the major axis of each of the liquid crystal molecules, wherein the first refractive index>the second refractive index, and the total reflection units have a refractive index matching with the first refractive index ne.

When the major axes of the liquid crystal molecules of the liquid crystal cells are arranged in a horizontal direction, the refractive index of the total reflection units is equal to the first refractive index ne of the liquid crystal molecules, and the ambient light incident from the second substrate 109 passes through the total reflection unit and the liquid crystal cell in turn, so that the photoresist can reflect lights of specific colors.

When the major axes of the liquid crystal molecules of the liquid crystal cells are arranged in a vertical direction, the refractive index of the total reflection units is greater than the second refractive index no of the liquid crystal molecules, so that the ambient light incident from the second substrate 109 is totally reflected at an interface between the total reflection units and the liquid crystal cells and then is emitted outward from the second substrate 109, and thus the photoresists cannot reflect lights of specific colors.

It can be understood that the photoresists in the embodiment of the present application include the polymerizable cholesteric liquid crystals. Applying the polymerizable cholesteric liquid crystals to a field of reflective displays and using the ambient light to facilitate displaying of the display panel can make the display panel display colorful patterns or text, and greatly reduce manufacturing cost of the display panel. Since each of the photoresists can be individually controlled to emit lights of specific colors according to whether or not the photoresists are irradiated by the ambient light, the display panel can achieve high-precision dynamic display. Because the light that enters people's eyes from the display panel is the light reflected by the photoresists, and the light being reflected filters out a large amount of high-energy and high-transmittance light, so that the light emitted from the display panel is harmless to the people's eyes, i.e., the display panel has an eye protection function.

It can be understood that for those of ordinary skill in the art, equivalent replacements or changes can be made according to the technical solutions and the technical concept of the present application, and all these changes or replacements shall fall within the protection scope of the appended claims of the present application.

What is claimed is:

1. A display panel, comprising:
a first substrate and a second substrate disposed opposite to the first substrate, wherein a photoresist layer, a liquid crystal layer, and a total reflection layer are sequentially disposed in a direction from the first substrate to the second substrate, the photoresist layer comprises a plurality of photoresists, the liquid crystal layer comprises a plurality of liquid crystal cells disposed in a one-to-one correspondence with the photoresists, and the total reflection layer comprises a plurality of total reflection units disposed in a one-to-one correspondence with the liquid crystal cells;
wherein liquid crystal molecules included in the liquid crystal cells have a first refractive index and a second refractive index, the first refractive index is a refractive index for light perpendicular to a major axis of each of the liquid crystal molecules, the second refractive index is a refractive index for light parallel to the major axis of each of the liquid crystal molecules, the first refractive index is greater than the second refractive index, and the total reflection units have a refractive index matching with the first refractive index.

2. The display panel of claim 1, wherein the photoresists comprise polymerizable cholesteric liquid crystals, and different parts of the polymerizable cholesteric liquid crystals of the photoresists for reflecting lights of different colors have different pitches.

3. The display panel of claim 2, wherein the polymerizable cholesteric liquid crystals of the photoresists for reflecting red light have a pitch greater than a pitch of the polymerizable cholesteric liquid crystals of the photoresists for reflecting green light, and the polymerizable cholesteric liquid crystals of the photoresists for reflecting the green light have a pitch greater than a pitch of the polymerizable cholesteric liquid crystals of the photoresists for reflecting blue light.

4. The display panel of claim 1, wherein a first electrode and a first alignment layer are sequentially disposed in a direction from the photoresist layer to the liquid crystal layer, and a second electrode layer and a second alignment layer are sequentially disposed in a direction from the second substrate to the liquid crystal layer.

5. The display panel of claim 4, wherein the first electrode layer comprises a plurality of first electrodes disposed in a one-to-one correspondence with the liquid crystal cells, and the second electrode layer comprises a plurality of second electrodes disposed in a one-to-one correspondence with the liquid crystal cells.

6. The display panel of claim 4, wherein polarity of the liquid crystal molecules of the liquid crystal cells is positive, and the first alignment layer and the second alignment layer are arranged in an anti-parallel alignment or in a parallel alignment;
wherein based on no voltage applied to the first electrodes and the second electrodes corresponding to the liquid crystal cells, the major axes of the liquid crystal molecules of the liquid crystal cells are arranged in a horizontal direction; and
wherein based on a voltage applied to the first electrodes and the second electrodes corresponding to the liquid crystal cells, the major axes of the liquid crystal molecules of the liquid crystal cells are arranged in a vertical direction.

7. The display panel of claim 4, wherein polarity of the liquid crystal molecules of the liquid crystal cells is negative, and the first alignment layer and the second alignment layer are arranged in a vertical alignment;
wherein based on a voltage applied to the first electrodes and the second electrodes corresponding to the liquid crystal cells, the major axes of the liquid crystal molecules of the liquid crystal cells are arranged in a horizontal direction; and
wherein based on no voltage applied to the first electrodes and the second electrodes corresponding to the liquid crystal cells, the major axes of the liquid crystal molecules of the liquid crystal cells are arranged in a vertical direction.

8. The display panel of claim 1, wherein each of the total reflection units is a prism and is semicircular or right angular in shape.

9. The display panel of claim 1, wherein a light absorption layer is disposed between the first substrate and the photoresist layer.

10. The display panel of claim 1, wherein a microlens layer is disposed between the total reflection layer and the second substrate or on a side of the second substrate away from the total reflection layer and comprises a plurality of microlens units.

11. A display device, comprising a display panel, the display panel comprising:
a first substrate and a second substrate disposed opposite to the first substrate, wherein a photoresist layer, a liquid crystal layer, and a total reflection layer are sequentially disposed in a direction from the first substrate to the second substrate, the photoresist layer comprises a plurality of photoresists, the liquid crystal layer comprises a plurality of liquid crystal cells disposed in a one-to-one correspondence with the photoresists, and the total reflection layer comprises a plurality of total reflection units disposed in a one-to-one correspondence with the liquid crystal cells;
wherein liquid crystal molecules included in the liquid crystal cells have a first refractive index and a second refractive index, the first refractive index is a refractive index for lights perpendicular to a major axis of each of the liquid crystal molecules, the second refractive index is a refractive index for lights parallel to the major axis of each of the liquid crystal molecules, the first refractive index is greater than the second refractive index, and the total reflection units have a refractive index matching with the first refractive index.

12. The display device of claim 11, wherein the photoresists comprise polymerizable cholesteric liquid crystals, and different parts of the polymerizable cholesteric liquid crystals of the photoresists for reflecting lights of different colors have different pitches.

13. The display device of claim 12, wherein the polymerizable cholesteric liquid crystals of the photoresists for reflecting red light have a pitch greater than a pitch of the polymerizable cholesteric liquid crystals of the photoresists for reflecting green light, and the polymerizable cholesteric liquid crystals of the photoresists for reflecting the green light have a pitch greater than a pitch of the polymerizable cholesteric liquid crystals of the photoresists for reflecting blue light.

14. The display device of claim 11, wherein a first electrode and a first alignment layer are sequentially disposed in a direction from the photoresist layer to the liquid crystal layer, and a second electrode layer and a second alignment layer are sequentially disposed in a direction from the second substrate to the liquid crystal layer.

15. The display device of claim 14, wherein the first electrode layer comprises a plurality of first electrodes disposed in a one-to-one correspondence with the liquid crystal cells, and the second electrode layer comprises a plurality of second electrodes disposed in a one-to-one correspondence with the liquid crystal cells.

16. The display device of claim 14, wherein polarity of the liquid crystal molecules of the liquid crystal cells is positive, and the first alignment layer and the second alignment layer are arranged in an anti-parallel alignment or in a parallel alignment;
wherein based on no voltage applied to the first electrodes and the second electrodes corresponding to the liquid crystal cells, the major axes of the liquid crystal molecules of the liquid crystal cells are arranged in a horizontal direction; and
wherein based on a voltage applied to the first electrodes and the second electrodes corresponding to the liquid crystal cells, the major axes of the liquid crystal molecules of the liquid crystal cells are arranged in a vertical direction.

17. The display device of claim 14, wherein polarity of the liquid crystal molecules of the liquid crystal cells is negative, and the first alignment layer and the second alignment layer are arranged in a vertical alignment;

wherein based on a voltage applied to the first electrodes and the second electrodes corresponding to the liquid crystal cells, the major axes of the liquid crystal molecules of the liquid crystal cells are arranged in a horizontal direction; and     wherein based on no voltage applied to the first electrodes and the second electrodes corresponding to the liquid crystal cells, the major axes of the liquid crystal molecules of the liquid crystal cells are arranged in a vertical direction.

18. The display device of claim 11, wherein each of the total reflection units is a prism and is semicircular or right angular in shape.

19. The display device of claim 11, wherein a light absorption layer is disposed between the first substrate and the photoresist layer.

20. The display device of claim 11, wherein a microlens layer is disposed between the total reflection layer and the second substrate or on a side of the second substrate away from the total reflection layer and comprises a plurality of microlens units.

\* \* \* \* \*